Figure 2:
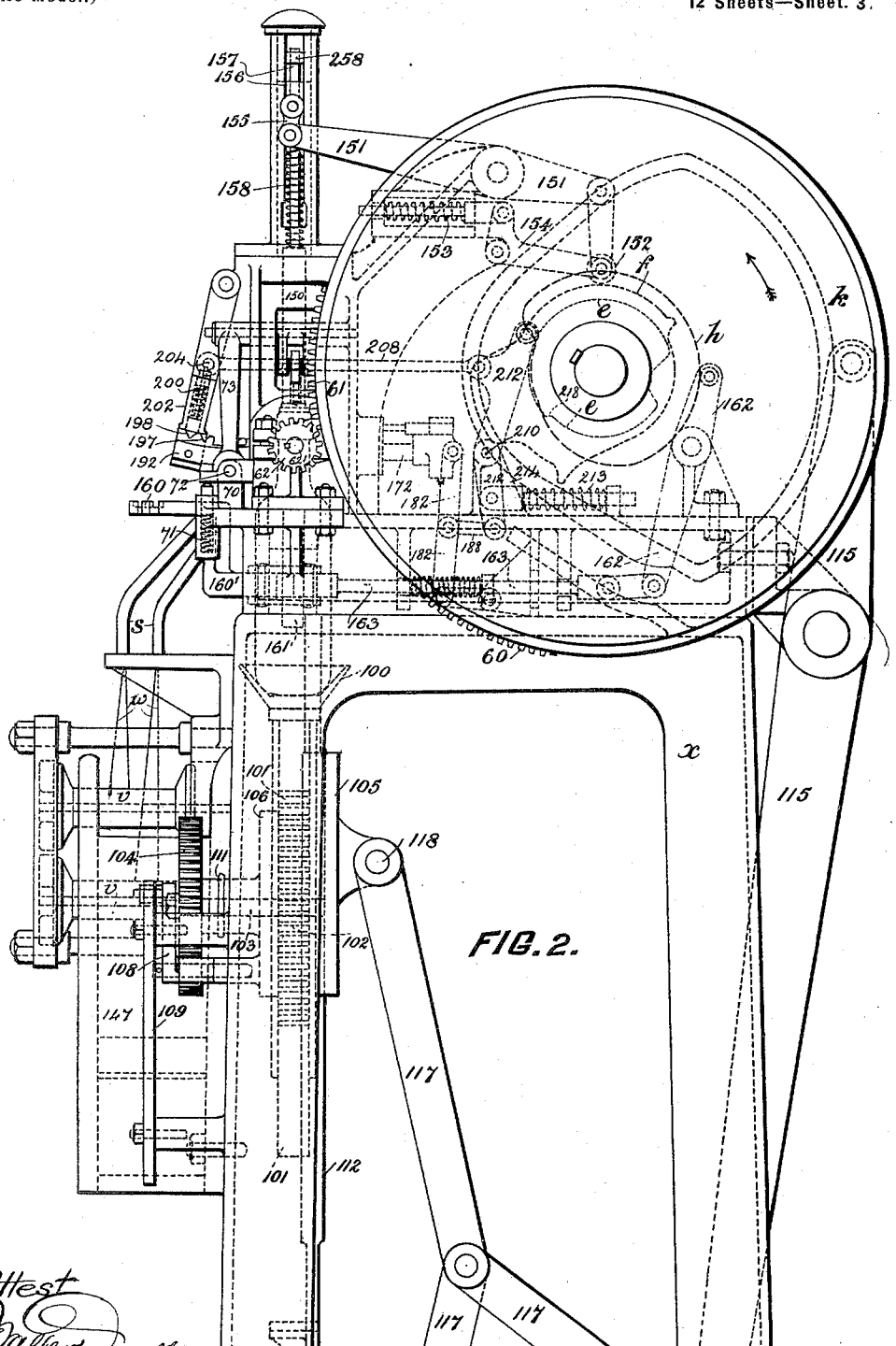

No. 642,206. Patented Jan. 30, 1900.
R. M. & C. E. CHAMBERS.
MACHINE FOR WIRING BOTTLES.
(Application filed Oct. 23, 1899.)
(No Model.) 12 Sheets—Sheet 1.
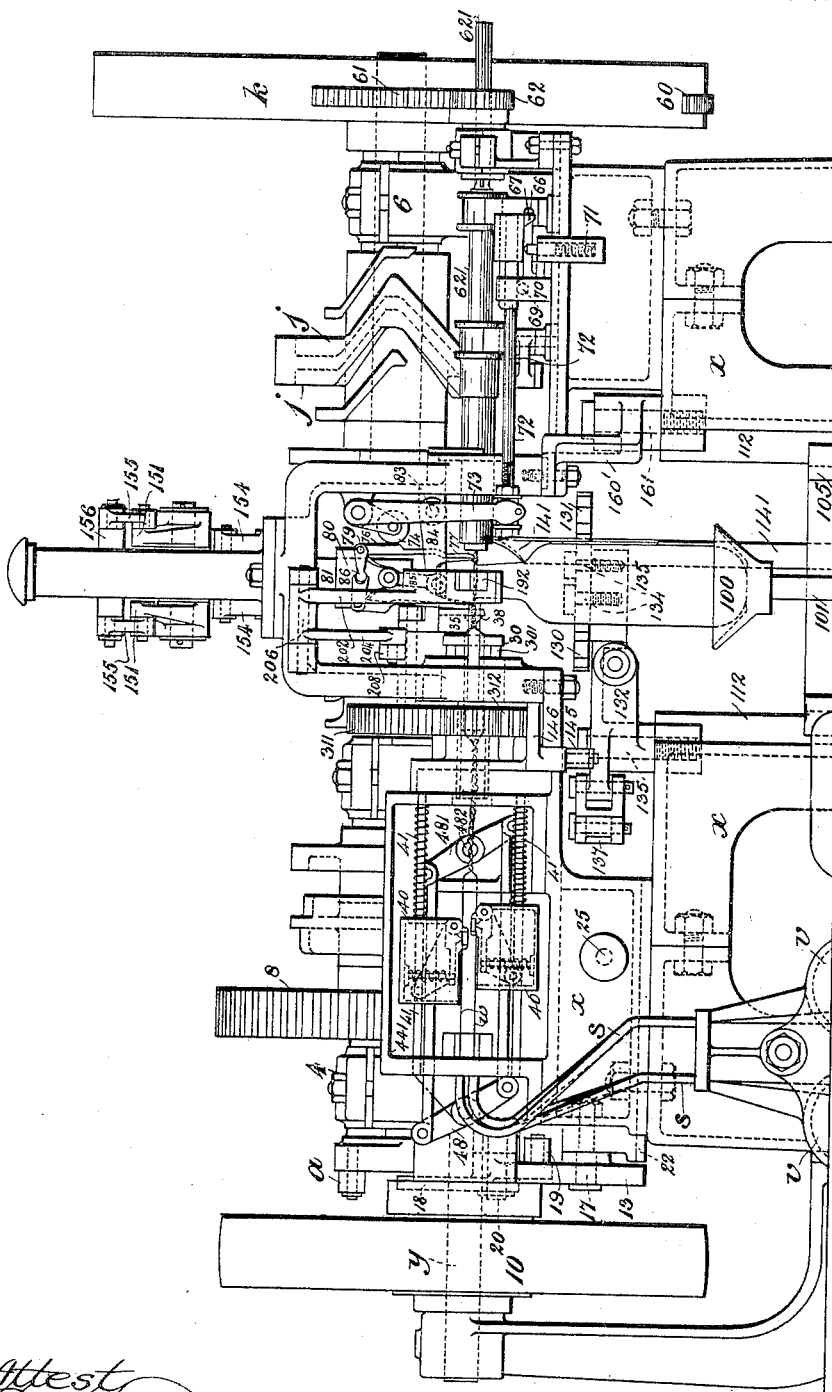
FIG.I.
Attest
Walter Donaldson
C. Charlton
Inventors
ROBERT M. CHAMBERS.
CHARLES E. CHAMBERS.
by Richards & Co. Attys.

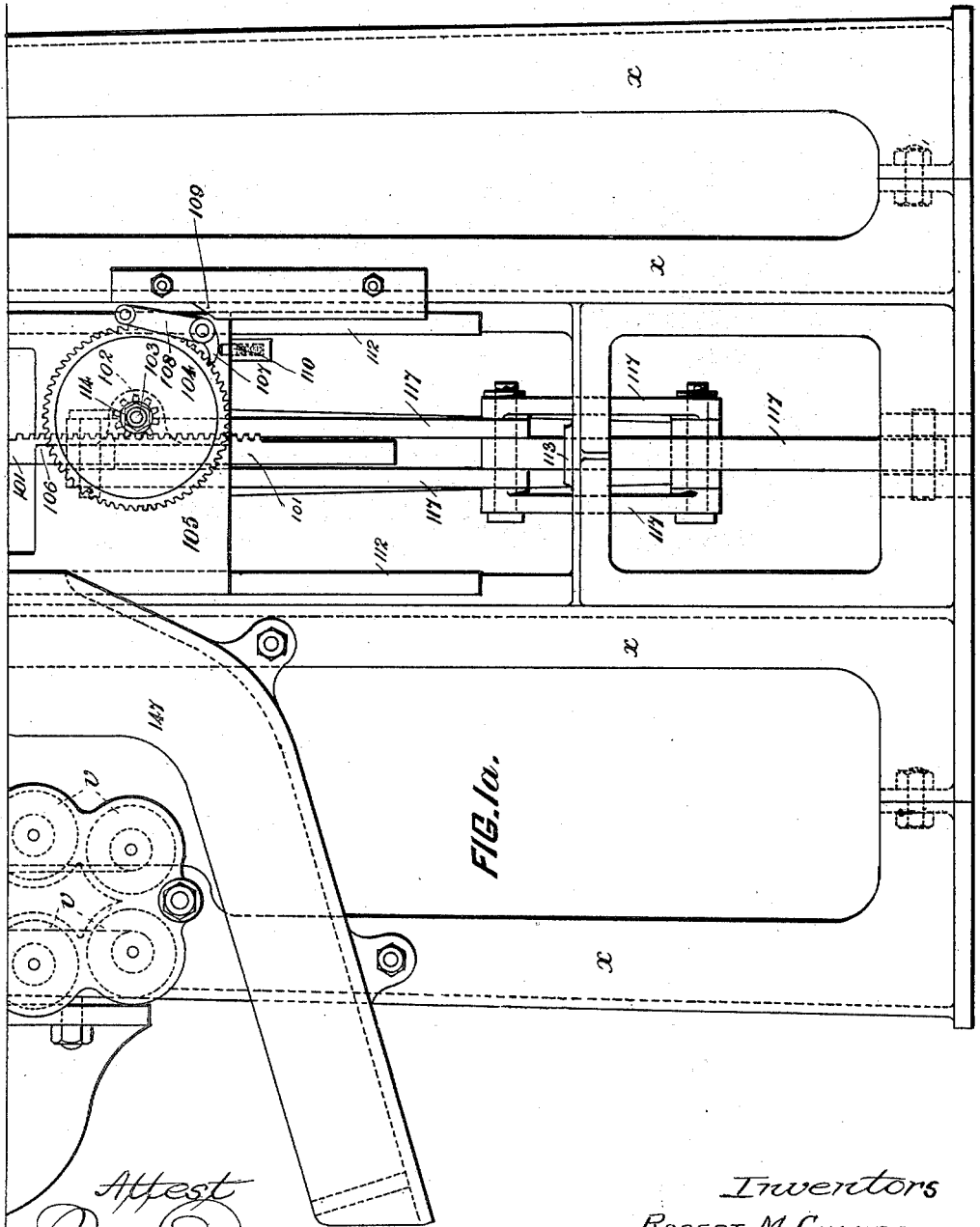

No. 642,206. Patented Jan. 30, 1900.
R. M. & C. E. CHAMBERS.
MACHINE FOR WIRING BOTTLES.
(Application filed Oct. 23, 1899.)

(No Model.) 12 Sheets—Sheet. 3.

Attest
Wallem Donaldson
C. H. Middleton

Inventors
ROBERT M. CHAMBERS
CHARLES E. CHAMBERS
by Richards & Co.

THE NORRIS PETERS CO., PHOTO-LITHO., WASHINGTON, D. C.

No. 642,206. Patented Jan. 30, 1900.
R. M. & C. E. CHAMBERS.
MACHINE FOR WIRING BOTTLES.
(Application filed Oct. 23, 1899.)
(No Model.) 12 Sheets—Sheet 4.
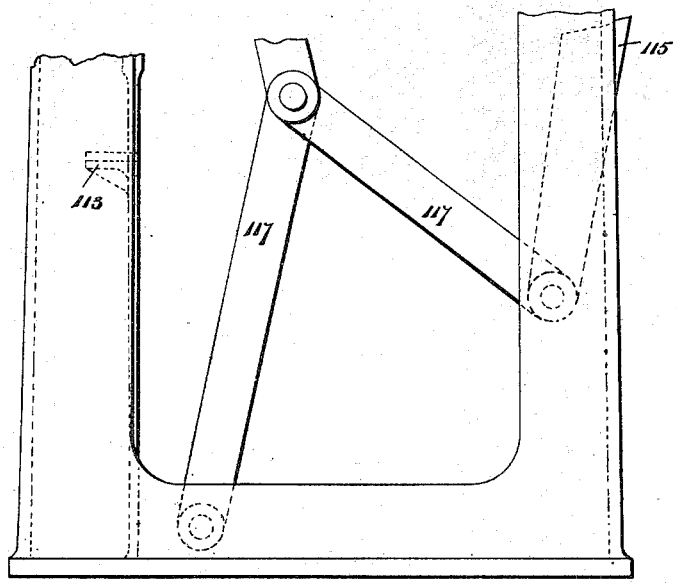
FIG. 2.ª

No. 642,206. Patented Jan. 30, 1900.
R. M. & C. E. CHAMBERS.
MACHINE FOR WIRING BOTTLES.
(Application filed Oct. 23, 1899.)
(No Model.) 12 Sheets—Sheet 5.

Attest
Waller Donaldson
C. F. Middleton

Inventors.
Robert M. Chambers
Charles E. Chambers
by Richards & Co
Attys.

THE NORRIS PETERS CO., PHOTO-LITHO., WASHINGTON, D. C.

No. 642,206. Patented Jan. 30, 1900.
R. M. & C. E. CHAMBERS.
MACHINE FOR WIRING BOTTLES.
(Application filed Oct. 23, 1899.)
(No Model.) 12 Sheets—Sheet 6.
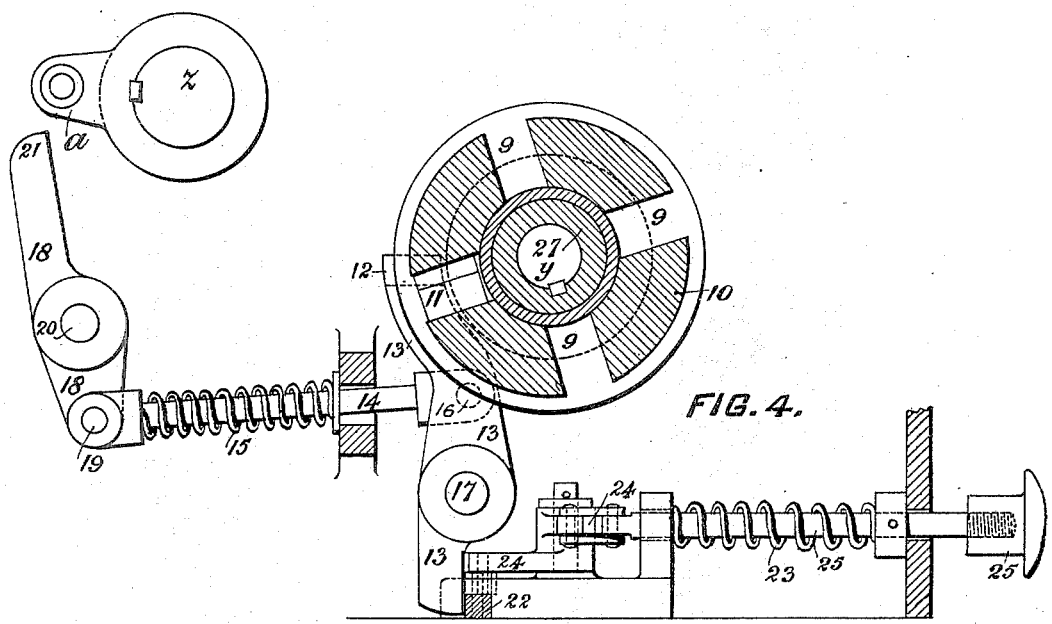
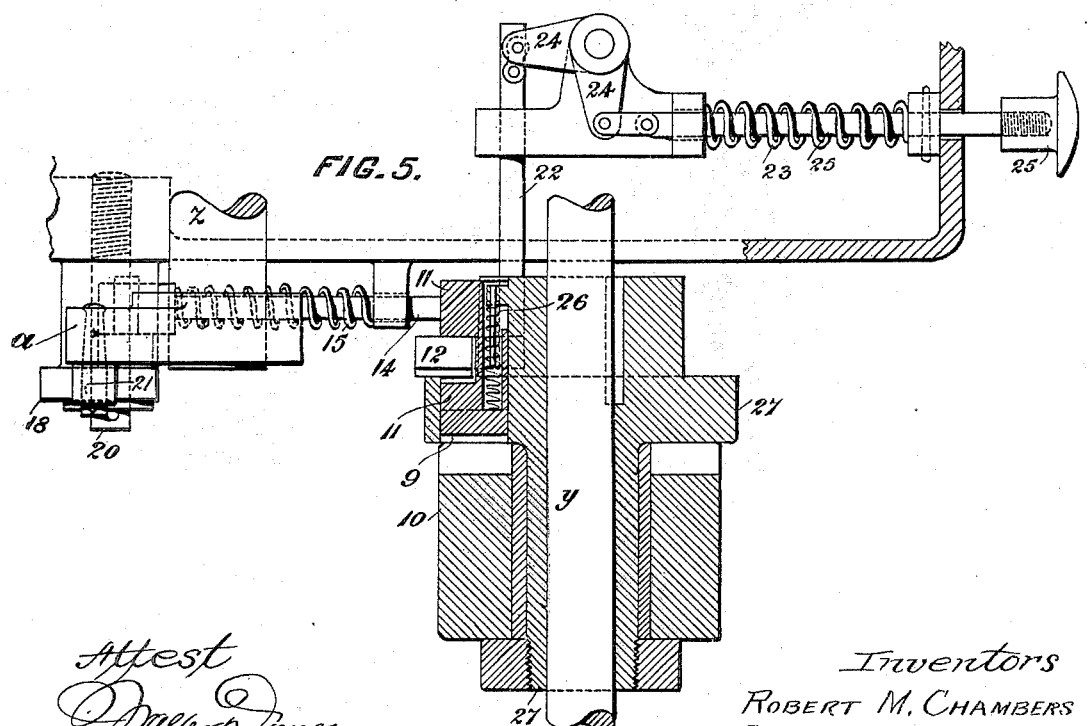
Inventors
ROBERT M. CHAMBERS
CHARLES E. CHAMBERS.
by Richards & Co.
Attys No. 642,206. Patented Jan. 30, 1900.
R. M. & C. E. CHAMBERS.
MACHINE FOR WIRING BOTTLES.
(Application filed Oct. 23, 1899.)

(No Model.) 12 Sheets—Sheet 7.

Inventors
ROBERT M. CHAMBERS
CHARLES E. CHAMBERS

No. 642,206. Patented Jan. 30, 1900.
R. M. & C. E. CHAMBERS.
MACHINE FOR WIRING BOTTLES.
(Application filed Oct. 23, 1899.)
(No Model.) 12 Sheets—Sheet 8.
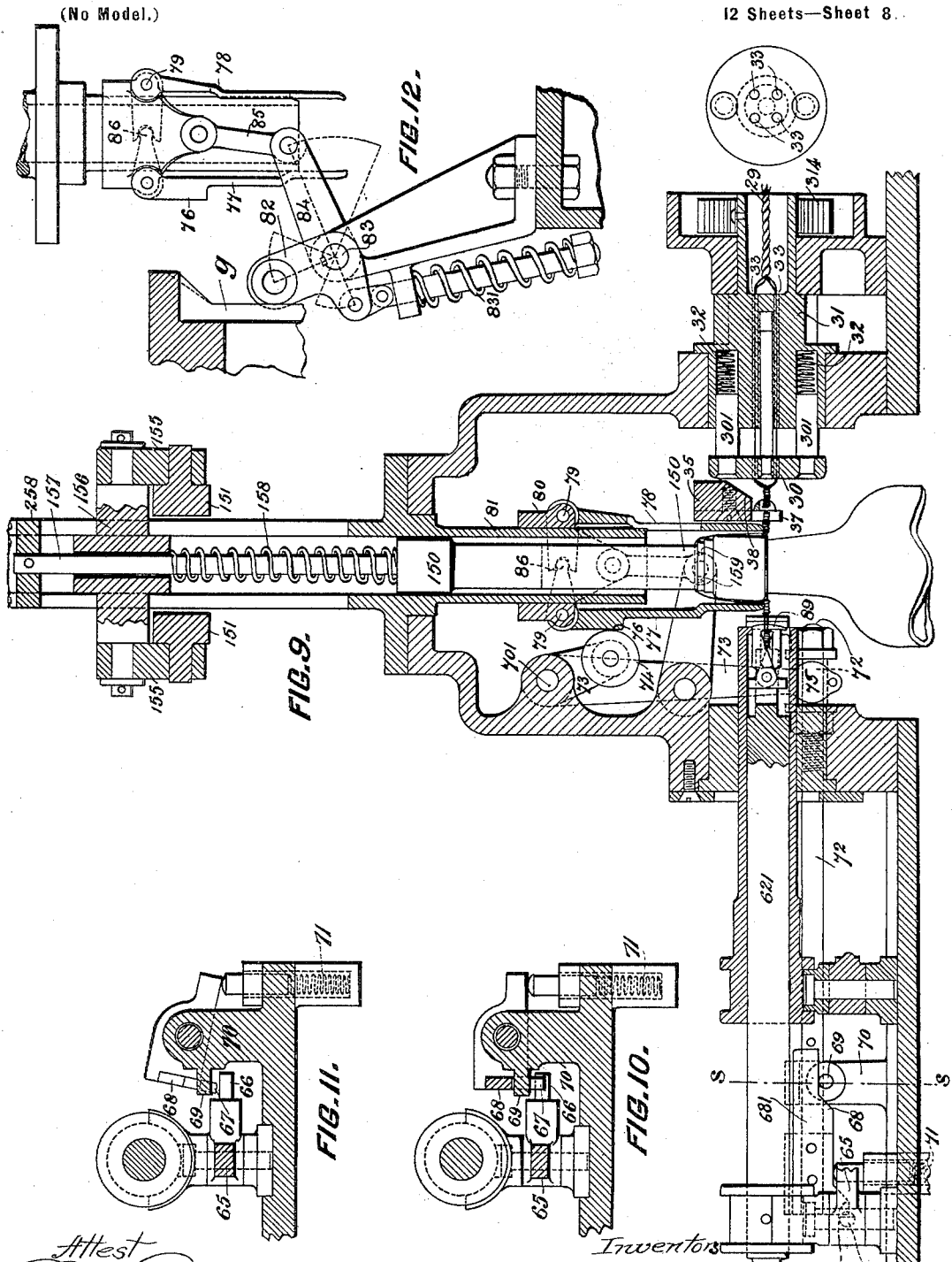
Inventors
ROBERT M. CHAMBERS
CHARLES E. CHAMBERS
By Richards & Co
Att'ys.
Attest
Walter Donaldson
C. H. Middleton No. 642,206. Patented Jan. 30, 1900.
R. M. & C. E. CHAMBERS.
MACHINE FOR WIRING BOTTLES.
(Application filed Oct. 23, 1899.)
(No Model.) 12 Sheets—Sheet 9.
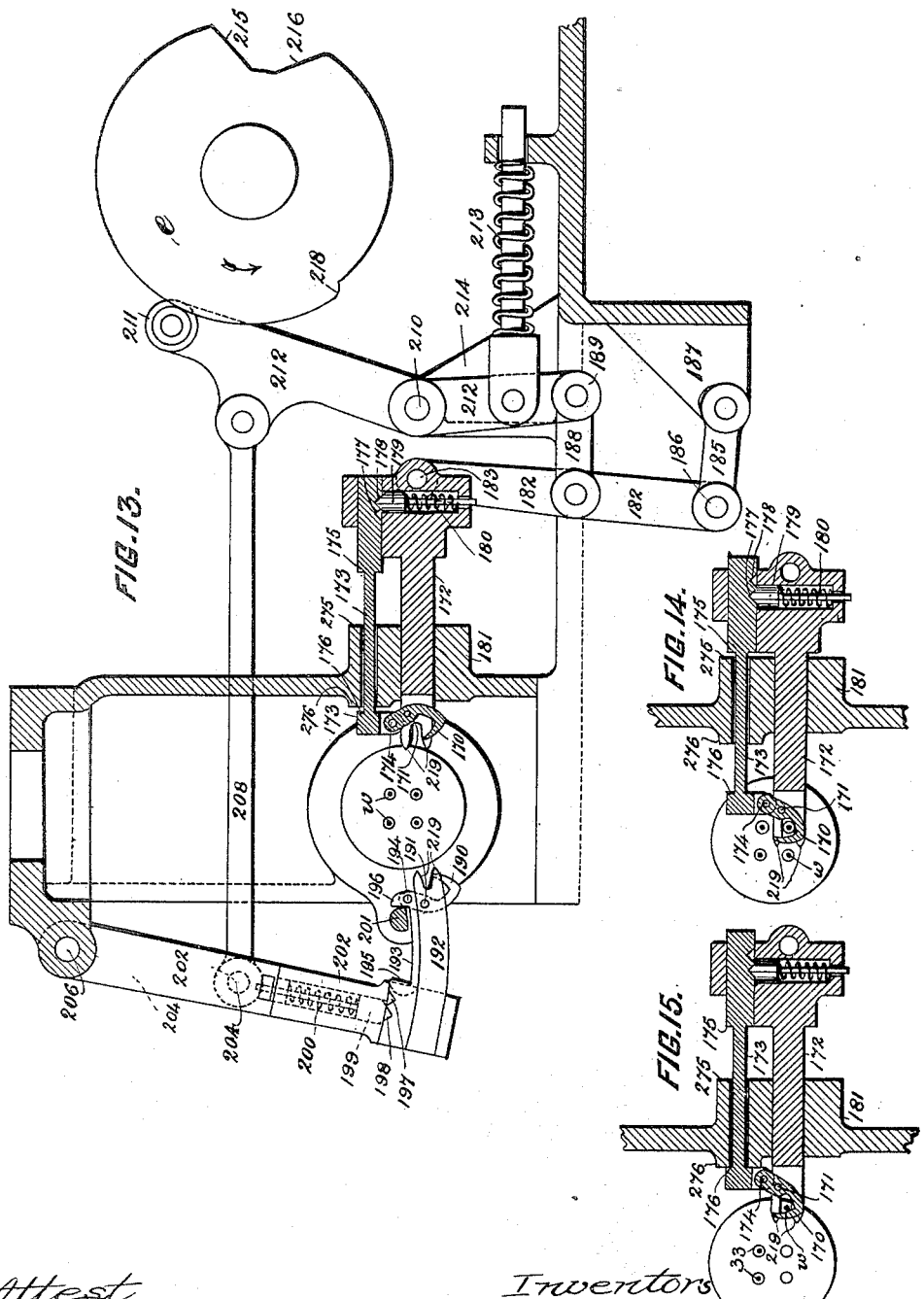
Attest
Walter Mackay
O. Middleton
Inventors
ROBERT M. CHAMBERS
CHARLES E. CHAMBERS
by Richards & Co
Att'ys No. 642,206. Patented Jan. 30, 1900.
R. M. & C. E. CHAMBERS.
MACHINE FOR WIRING BOTTLES.
(Application filed Oct. 23, 1899.)

(No Model.)

12 Sheets—Sheet 10.

Inventors
ROBERT M. CHAMBERS
CHARLES E. CHAMBERS
by Richards & Co. Attys

No. 642,206. Patented Jan. 30, 1900.
R. M. & C. E. CHAMBERS.
MACHINE FOR WIRING BOTTLES.
(Application filed Oct. 23, 1899.)

(No Model.) 12 Sheets—Sheet 11.

Inventors
Robert M. Chambers
Charles E. Chambers
by Richards & Co
Attys.

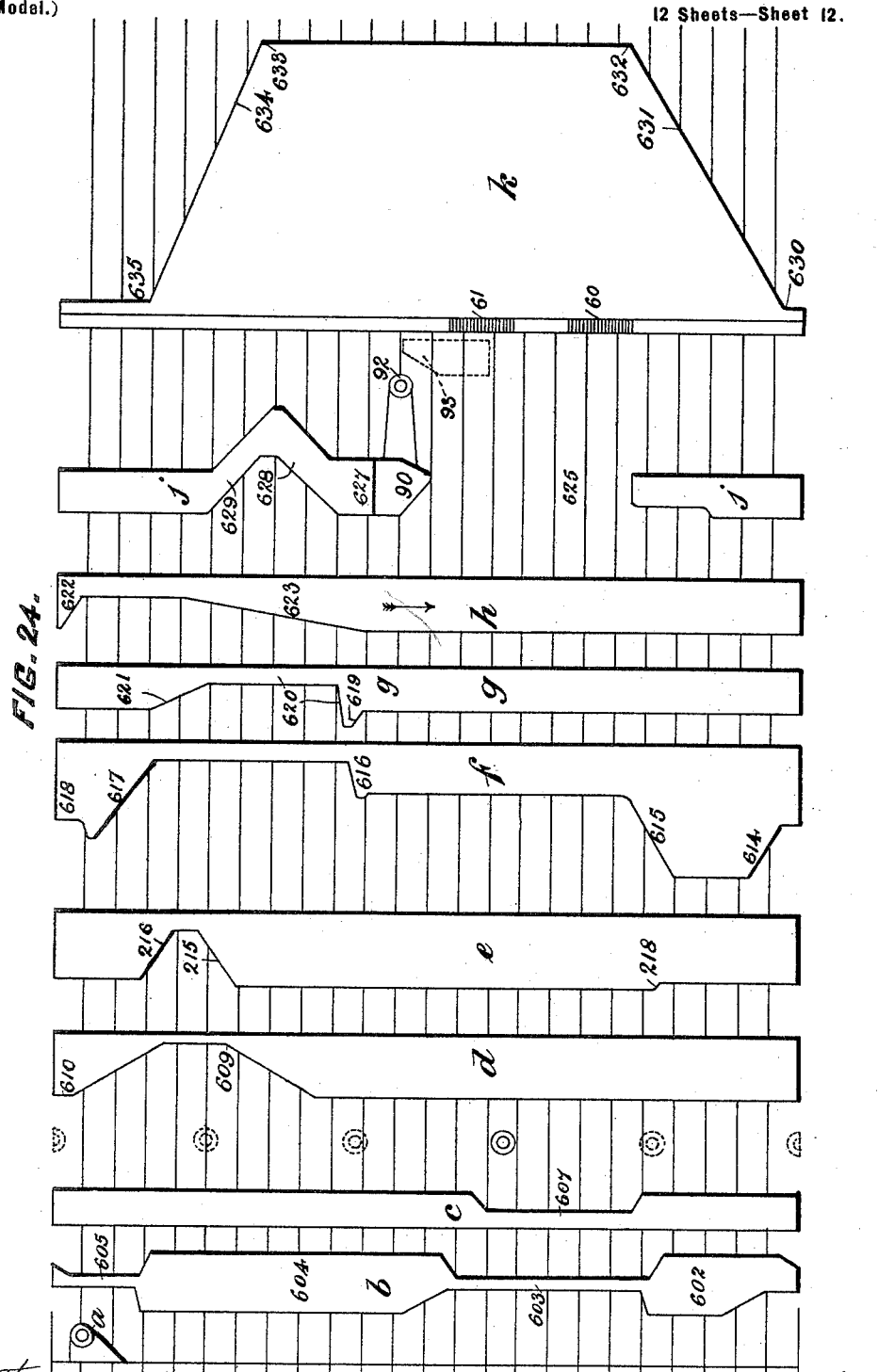

UNITED STATES PATENT OFFICE.

ROBERT MARTIN CHAMBERS AND CHARLES EDWARD CHAMBERS, OF BELFAST, IRELAND.

MACHINE FOR WIRING BOTTLES.

SPECIFICATION forming part of Letters Patent No. 642,206, dated January 30, 1900.

Application filed October 23, 1899. Serial No. 734,496. (No model.)

*To all whom it may concern:*

Be it known that we, ROBERT MARTIN CHAMBERS and CHARLES EDWARD CHAMBERS, engineers, subjects of the Queen of Great Britain and Ireland, residing at Cuba street, Belfast, county Antrim, Ireland, have invented certain new and useful Improvements in and Relating to Machines for Wiring Bottles, (for which we have made applications for Letters Patent in Great Britain, No. 6,369, dated March 24, 1899, and No. 13,446, dated June 26, 1899,) of which the following is a specification.

This invention relates to machines for wiring the corks of bottles, and is more especially applicable to a machine such as that which is the subject-matter of Letters Patent No. 632,174, previously granted to us.

The object of the invention is to render such machines more automatic and efficient in operation and capable of consecutively receiving bottles of varying shape and size without the necessity of adjustment or regulation of any part of the machine.

The invention consists of a machine, such as hereinafter described, comprising starting mechanism, mechanism for raising the bottle to a suitable position for wiring and for delivering the same after wiring, mechanism for compressing the cork immediately the machine is started, capsuling mechanism, wire-operating mechanism comprising means for feeding, tightening, twisting, looping, and cutting the wire, and other mechanism and novel features of construction hereinafter described as applied thereto.

The invention is illustrated in the accompanying drawings, in which—

Figure 3:
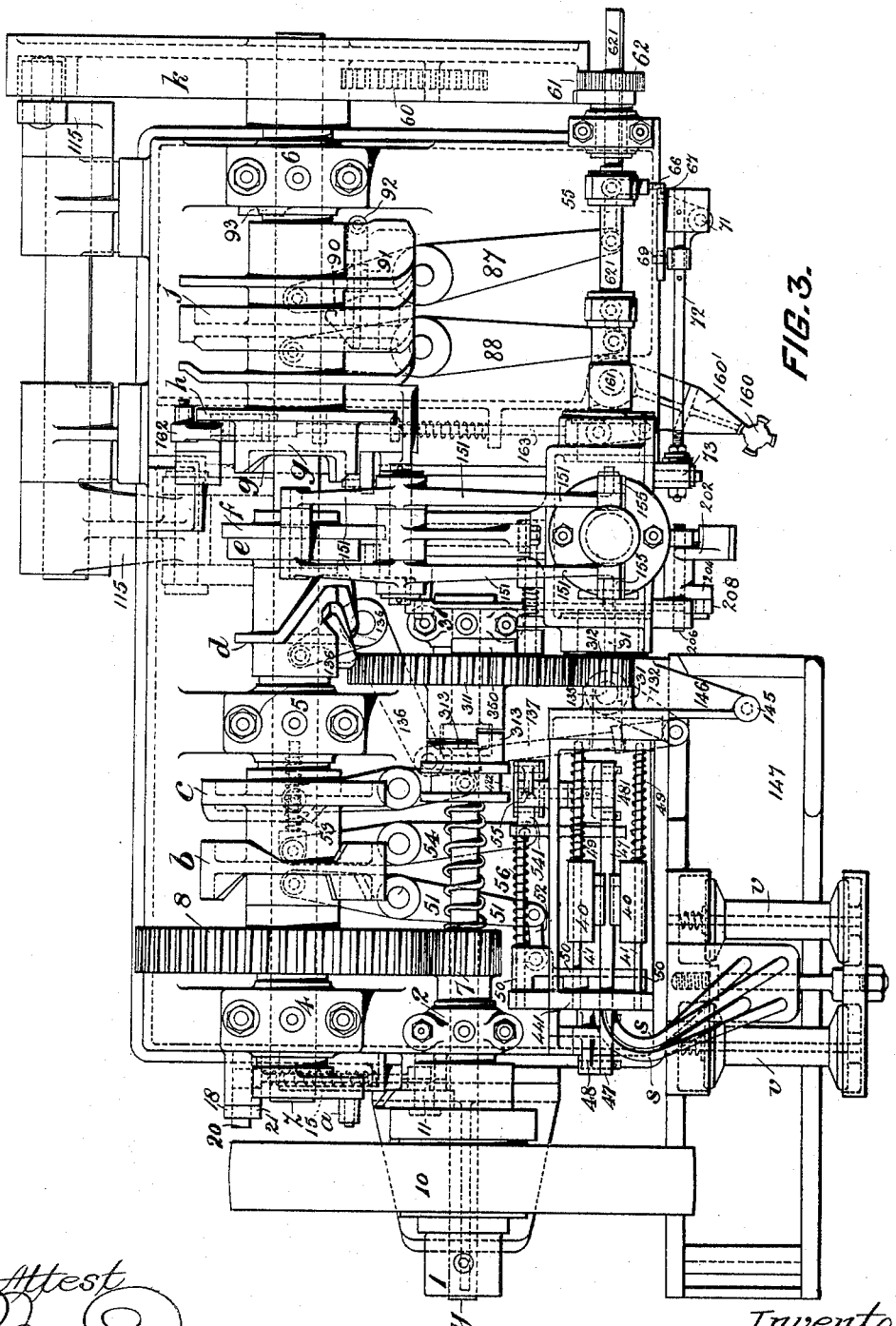
Figure 6:
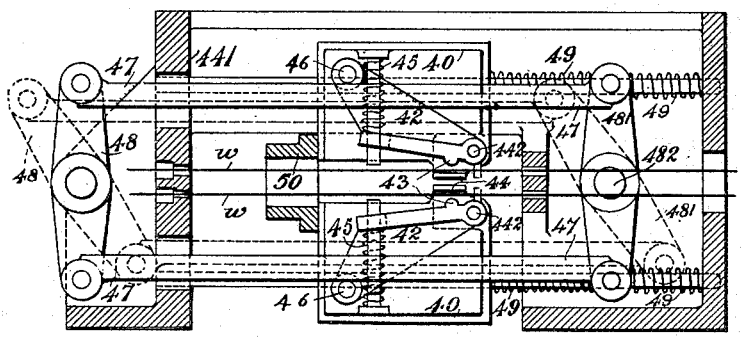
Figure 7:
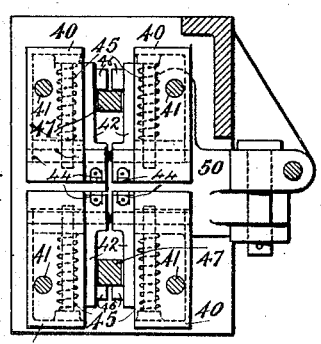
Figure 8A:
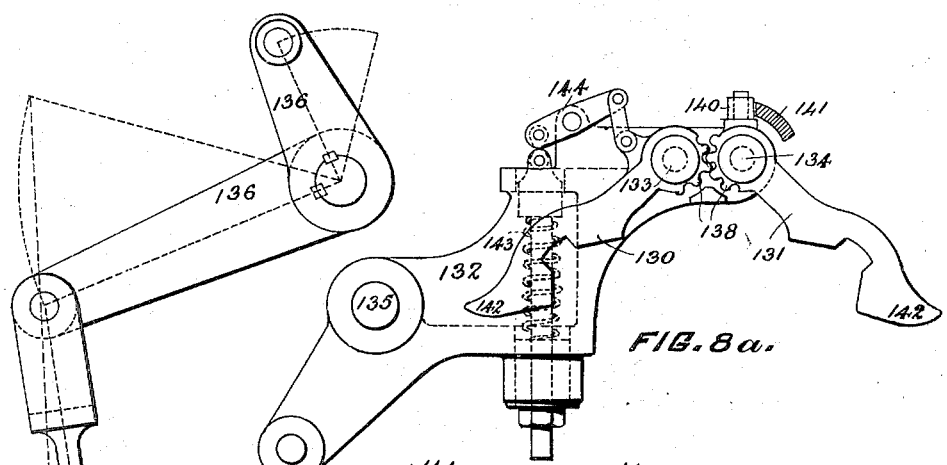
Figure 8:
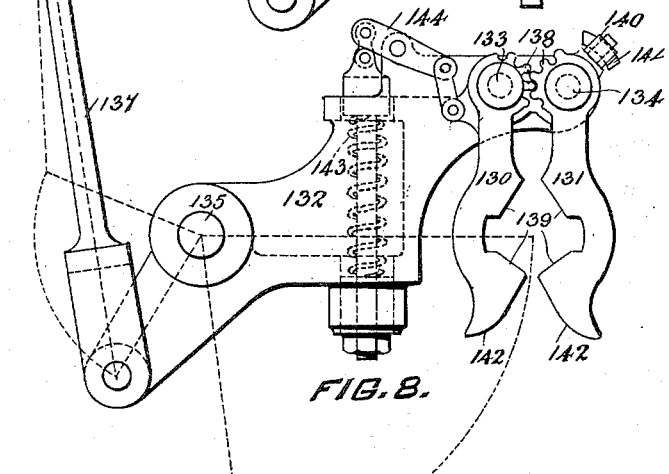
Figures 16, 17, 18, 19, 20, 21:
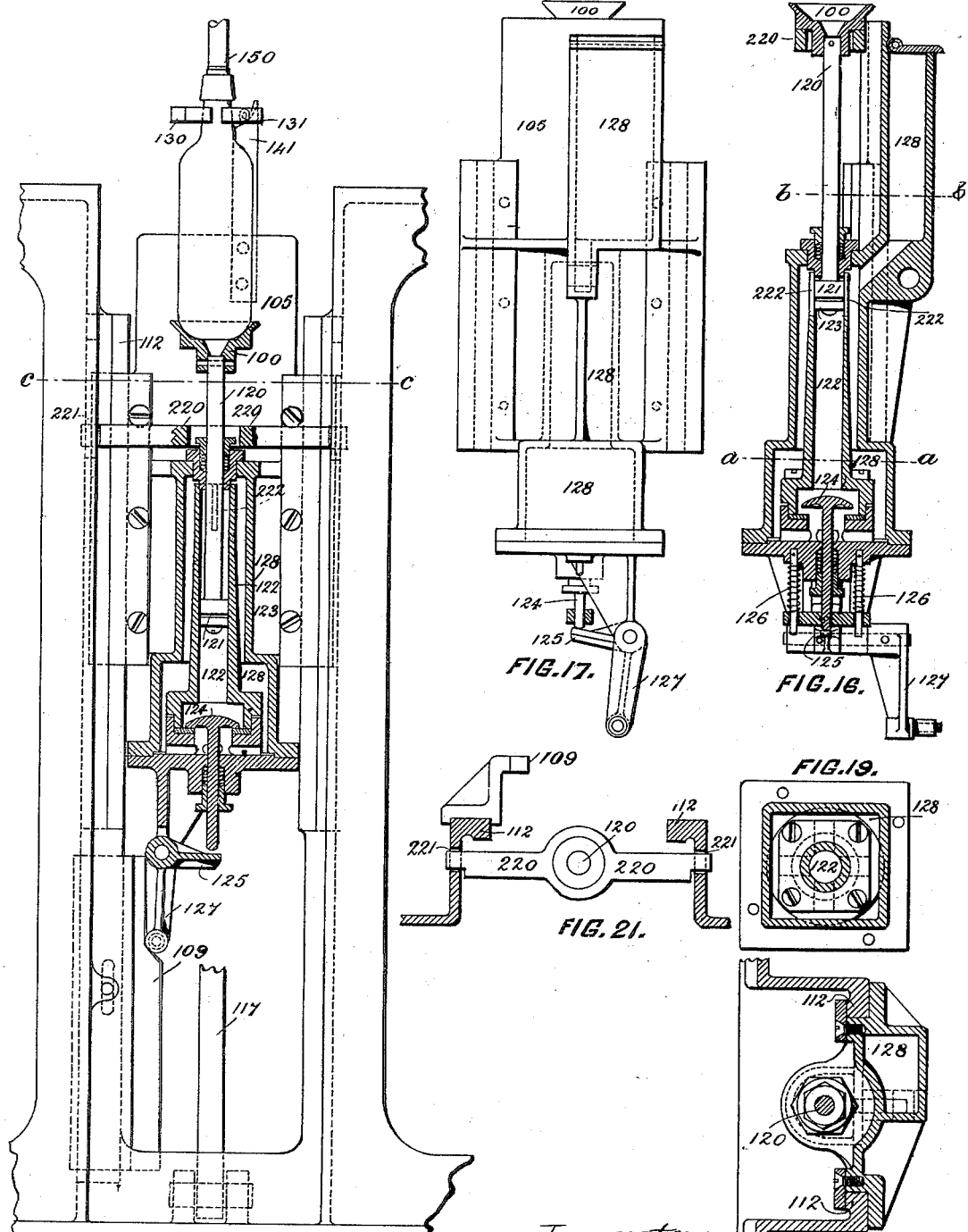
Figure 22:
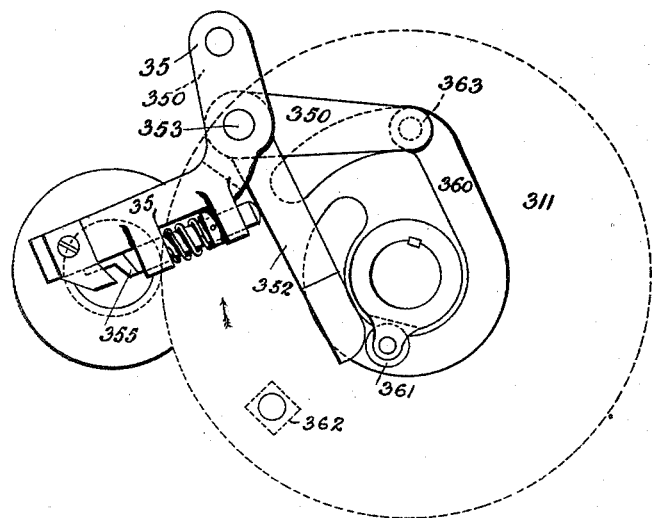
Figure 23:
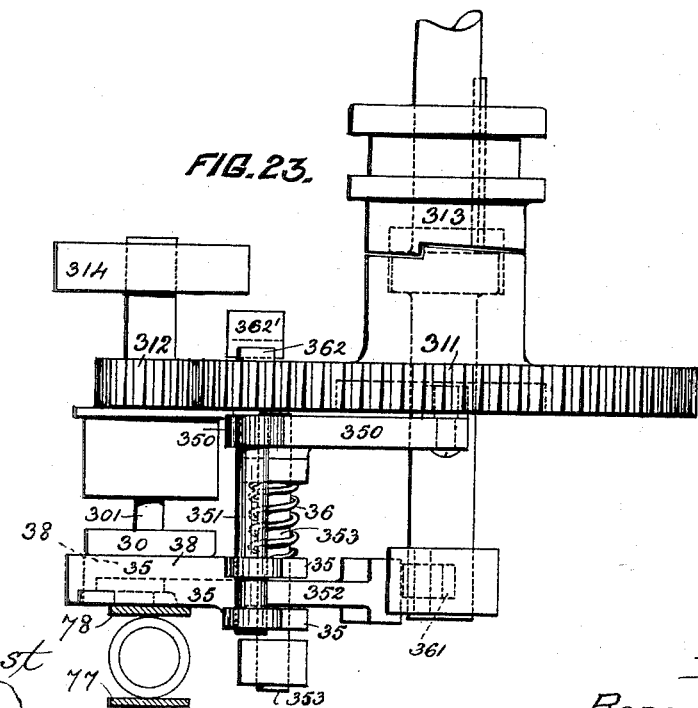

Figures 1 and 1ª are partial front elevations, Figs. 2 and 2ª partial side elevations, and Fig. 3 a plan, of a complete machine constructed according to the invention. Figs. 4 to 23 illustrate in detail the different devices or mechanisms which together constitute the complete machine. Figs. 4 and 5 are respectively sectional elevation and sectional plan of the starting mechanism. Figs. 6 and 7 are respectively front and end sectional elevations of the wire-tension gear. Figs. 8 and 8ª are plans of the bottle-delivery gear. Fig. 9 is a rear sectional elevation of part of the machine, illustrating the wire looping and twisting gear and also the means employed for compressing the cork, the means for bending the wire against the bottle after it has been twisted and cut off, and the means of adjusting the twisting-spindle, wire-cutter, and looping-spindle to varying sizes of bottle-necks. Figs. 10 and 11 are sectional elevations on the line *s s*, Fig. 9. Fig. 12 is a detail elevation of part of the mechanism shown in Fig. 9. Figs. 13, 14, and 15 illustrate in section the mechanism employed for guiding some of the wires onto the bottle-neck. Figs. 16 to 21 illustrate in detail an alternative device for raising the bottle to the position for wiring. Figs. 16 and 17 are respectively a sectional side elevation and front elevation of the device shown separately, while Fig. 18 is a sectional elevation of the device shown applied to the machine. Figs. 19 and 20 are sectional plans on the lines *a a, b b*, Fig. 16, respectively. Fig. 21 is a detail sectional plan on line *c c*, Fig. 18. Figs. 22 and 23 are respectively an elevation and plan of the wire-cutting gear. Fig. 24 shows the developed plans of the several cams hereinafter referred to.

In the drawings similar parts are indicated by similar reference letters or numerals.

The main driving-shaft *y* of the machine is mounted in bearings 1 2 3 and transmits motion to the cam-shaft *z*, mounted in bearings 4 5 6, through spur-gearing 7 8, the cam-shaft preferably being arranged to make one revolution to five of the driving-shaft.

Upon the cam-shaft *z* are mounted a cam *a*, operating means for stopping the machine, a double cam *b* for actuating the tension-gear, a cam *c*, controlling the twisting-gear, a cam *d* for actuating the bottle-delivery mechanism, a cam *e* for operating means for drawing aside the two lower wires for the purpose hereinafter described, a cam *f* for raising and lowering the presser or capsule lifter, a cam *g* for moving the bending-down levers, a cam *h* for actuating the capsule-carrier, a double cam *j* for operating the looping mechanism, and a cam *k* for operating the bottle-lifting gear.

The mechanism for starting the machine is illustrated in detail in Figs. 4 and 5. The driving-pulley 10 revolves freely on a sleeve 27 when the machine is at rest; but when it is desired to start the machine a key 11, mounted in an extension of the sleeve 27 and sliding under the action of a spring 26, is allowed to engage with one of a series of radial slots in the face of the pulley 10, which is thereby keyed to the driving-shaft, and the machine is started. The key 11 is slotted, and it is withdrawn from engagement with the pulley 10 by means of a wedge 12, engaging within the slot. The wedge 12 is carried upon one end of a lever 13, mounted upon a pivot 17 and connected by a pin 16 and rod 14 to one end 19 of a lever 18, mounted upon a pivot 20. The wedge 12 is withheld from engagement with the key 11 by a spring 15; but it is caused to engage and withdraw the said key at the end of each wiring operation, when the cam $a$, mounted upon the shaft $z$, makes contact with the end 21 of the lever 18. In order that the wedge 12 shall be held in engagement with the key until it is again required to start the machine, a latch or catch-bar 22 is adapted to engage with the opposite end of the lever 13. This latch may, if desired, be operated by a bottle when placed in the delivery-jaws, hereinafter referred to; but it is preferably connected by a bell-crank lever 24 to a push-rod 25. The push-rod is provided with a spring 23, which tends to hold the latch 22 in contact with the end of the lever 13.

When it is desired to start the machine, the push-rod 25 is thrust inwardly, whereupon the latch 22 is withdrawn from the end of the lever 13, which latter under the action of the spring 15 oscillates about its pivot 17 and moves the wedge 12 away from the key 11, which is immediately shot into engagement with the driving-pulley 10, and motion is thereby transmitted to the driving-shaft $y$.

When the machine is started, the bottle to be wired, which has previously been placed in the machine, is raised up to a suitable position for wiring according to one modification, as follows: The bottle is placed within a pair of gripping-levers, hereinafter described, and is thereby held suspended above a support or pan 100, mounted upon a rack-bar 101, gearing with a pinion 102, keyed upon the same shaft 103 as a ratchet-wheel 104. The shaft 103 is carried in bearings in a bracket 105, in which the rack-bar 101 is free to slide in guides 106. A pawl 107, mounted upon the bracket 105, is held in engagement with the ratchet-wheel by a spring-button 110. The pawl is disengaged from the ratchet-wheel at the desired moment by a lever 108, forming an extension of the pawl 107, coming in contact with a cam-plate 109, secured to the machine-framework. When the ratchet-wheel is released by the pawl 107, the bottle-support 100 is free to move relatively to the bracket 105; but when the ratchet-wheel is held by the pawl the support 100 is also held fixed relatively to the bracket. In order that the bottle-support 100 shall rise with the bracket 105, a friction-washer 111, Fig. 2, is placed between the boss on the wheel 104 and that on the bracket 105, the pressure on said washer being regulated by a nut 114, so that there is sufficient friction to support the rack 111, with its support 100, but to allow of a certain amount of slip should a considerable pressure be applied to the said support. The bracket 105 is moved vertically on guides 112 by a cam $k$, operating through levers 115 and toggle-links 117, one pair of which is connected at 118 to the bracket.

The operation of the bottle-lifting gear above described is as follows: A bottle is placed within a pair of gripping-levers 130 131, hereinafter described in reference to Fig. 8, and is thereby held suspended above the holder 100. The capsule-lifter or plunger 150 is then brought down by its cam $f$, as afterward described in detail, onto the cork, so as to compress it and prevent it being ejected by the gas-pressure in the bottle. The lifting-bracket 105 next starts to rise and carries with it the holder 100 until the latter reaches the bottle, when the resulting pressure temporarily arrests the further upward movement of the holder, the rack 101 revolving the pinion 102 and wheel 104 until the lever 108 leaves the cam-plate 109 and the pawl 107 engages the wheel 104 and locks the holder 100 to the lifting-bracket. At this instant the cam $f$, which operates the plunger or capsule-lifter 150, allows the latter to ascend equally with the lifting-bracket, and the holder 100 being locked to the bracket the bottle is raised through a certain definite distance above the top of the gripping-levers 130 131 to a position at which the bottom wires will just fall under the collar on the bottle-neck, the gripping-levers opening to allow the bottle to pass between them. When in the last-mentioned position, the bottle is wired. The bracket 105 then descends and carries with it the holder 100 until the lever 108 comes in contact with the cam-plate 109 and the bottom end of the rack-bar 101 comes in contact with a stop 113, whereupon the said bar revolves the pinion 102 and wheel 104 until the bracket reaches its lowest position. The relative movements of the lifting-bracket are indicated by the developed plan of the operating-cam $k$ in Fig. 24. As the cam rotates the part 630 first operates the lever 115 and the bracket 105 starts to rise, at 631 the bottle starts to rise, at 632 the bottle arrives at its highest position, at 633 the bottle begins to descend, at 634 the bottle is caught by the delivery-arms, and at 635 the lifting-bracket has descended to its lowest position. An alternative means for securing a self-adjustment between the bottle-support 100 and the lifting-bracket 105 is illustrated in Figs. 16 to 21.

The bottle-support 100 is carried by a rod 120, to the other end of which is attached a piston 121, packed with a leather 123 and working in a cylinder 122. The cylinder 122 communicates at its lower end by a valve 124 with a surrounding jacket or casing 128, which is secured to or cast in one with the lifting-bracket 105. The cylinder 122 and chamber 128 contain oil or other suitable liquid, and when the valve 124 is open the piston 121 is free to slide up or down, the liquid accordingly flowing in or out of the cylinder; but when the valve is closed the piston is prevented from moving downwardly relatively to the lifting-bracket, but moves as one piece therewith, the said bracket being operated as in the modification previously described. The valve 124 is opened toward the end of the downward stroke of the lifting-bracket 105 by a cam-plate 109 through levers 127 and 125, which are returned by springs to their normal position and allow the valve to shut as the lifting-bracket is raised and the roller on the end of the lever 127 leaves the cam-plate 109.

The top end of the cylinder 122 is perforated or slotted, as at 222, to allow any air to escape which may collect below the piston, the latter passing above the slots at the termination of each downward stroke of the bracket 105.

To serve as a packing for the piston-rod and to insure that it shall not fall relatively to the lifting-bracket when the valve 124 is open except when considerable pressure is applied, a gland is provided, the friction of which is sufficient to prevent the rod sliding downwardly until the lever 127 leaves the cam-plate 109 and the valve 124 closes.

The piston-rod is withdrawn from the cylinder 122 by a crutch 220, which arrests the holder 100 as it descends with the lifting-bracket. The crutch is loosely supported in grooves 221 in the frame of the machine, and it is arranged at such a height that the piston-rod is withdrawn a sufficient distance to suit the shortest of the bottles to be wired.

After the bottle has been wired it is removed from the holder 100 and delivered into a chute or receptacle by mechanism, such as clearly shown in detail in Figs. 8 and 8$^a$.

A bracket 132, pivoted at 135 to the machine-frame, carries on one extremity two levers 130 131, which pivot on pins 133 134 and are geared together, as shown at 138, in order that they shall have equal angular movement. The levers are formed with four inclined faces 139, two on each lever, in order that they may hold the bottles centrally below the compressor 150, hereinafter described, even should the size of the necks vary. They are forced together by a spring 143, acting through a pivoted lever 144, and their outer ends 142 are beveled, as shown, to allow a bottle to be readily slipped into position to be gripped by the faces 139. The lever 131 is provided with a pin or roller 140, with which a cam-plate 141 on the bottle-lifting bracket comes in contact and opens the levers 130 131, as shown in Fig. 8$^a$, to allow the bottle to pass up between them as it is being raised to the wiring position. After the bottle is wired and starts to descend the cam-plate releases the roller 140 in time to allow the levers 130 131 to grip the bottle-neck just below the collar and hold the bottle suspended. The bracket 132 is then oscillated on its pivot 135 by the cam $d$ through the levers 136 and link 137 until the beveled end 142 of the lever 130 comes in contact with a roller 145, mounted on a bracket 146, Figs. 1 and 3, when the levers 130 131 are thereby forced apart and drop the bottle into a chute 147. The bracket 132 is then returned to its normal position ready to receive another bottle. The developed plan of the cam $d$ is shown in Fig. 32, the part 609 indicating the part by which the bracket 132 is moved fully out to deliver a bottle and the part 610 at which the bracket has been moved fully in again to receive another bottle.

The mechanism for applying a capsule to a bottle-cork and for compressing the latter within the bottle is illustrated in detail in Fig. 9 and in position in Figs. 2 and 3.

The capsules are supplied to a tray 160, Figs. 2 and 3, either by hand or automatically, as described in the specification to the Letters Patent before referred to. The tray is carried by an arm 160', pivoted at 161 to the machine-frame, and is brought centrally under a plunger 150 at the correct time by a cam $h$, acting through a lever 162 and connecting-rod 163, Fig. 2. The respective parts of the cam $h$ which operate the tray and bring it fully out and fully in below the capsule-lifter are indicated by 622 and 623 in the developed plan, Fig. 24. The plunger 150 is caused to descend and secure the capsule from the tray upon pins 159. It is actuated from a cam $f$ by levers 151, which carry on their extremities a roller 152, held in contact with the cam $f$ by a spring 153 through a bell-crank lever 154. (See Fig. 2.) The levers 151 are not connected directly to the plunger 150, but act through links 155 on a cross-head 156, which slides freely on the rod 157, to which the plunger is attached. A buffer-spring 158 is inserted between the plunger and cross-head, held in compression by a collar 258, firmly attached to the rod 157. This elastic connection allows of variation in the size of corks or the collars or necks of the bottles. The plunger is slotted at its extremity to enable it to pass over the two top wires when it is depressed by the cam $f$ to secure a capsule, as above described. After it secures a capsule upon the pins 159 on its extremity it rises and the capsule-tray 160 is removed to its outward position, (see Fig. 3,) whereupon the machine stops, ready for a bottle to be placed in the gripping-levers 130 131. When the bottle is placed therein and the machine started, the plunger 150, carrying a capsule on its face, descends onto the cork and compresses the latter. The bottle is then raised into the wiring position by the lifting-bracket, as before described, the plunger 150 being allowed by the cam $f$ to ascend equally with the bracket.

After the bottle is wired and the lifting-bracket starts to descend the capsule-lifter follows the bracket for a short distance, but is soon raised up again until it reaches its highest position and does not descend again until it is required to secure a capsule.

The relative movements of the capsule-lifter correspond with the several parts of the cam $f$. (Indicated in Fig. 24.) At 614 the capsule-lifter descends onto the bottle-cork, at 615 it ascends, but maintains a pressure on the cork, at 616 it rises farther to allow the looping and side hooks to pass below it, at 617 it descends to secure a capsule, and at 618 it ascends a little to allow the carrier to move out.

The wires employed for tying the corks are led from reels $v$ through guides $s$, as in the machine described in the specification to Letters Patent No. 632,174.

In the present invention a tension is applied to the wires, as required by the mechanism illustrated in detail in Figs. 6 and 7 and shown in position in Figs. 1 and 3. The wires $w$ are passed through a casing 441, attached to the machine-frame. Inside the casing are arranged four boxes 40, hereinafter referred to as "tension-boxes," capable of sliding upon guide-rods 41. Each tension-box is provided with a gripping-lever 42, which pivots upon a pin 442, and is formed with a projecting face 43, adapted to engage with an opposing face 44 on the tension-box. The wires pass between the several faces 43 44 and are gripped between them whenever the levers 42 are moved about the pins 442 toward the wires by the springs 45. The levers 42 are moved outwardly, so as to release the wires by bars 47 engaging with pins 46 on said levers. The bars are connected by equal and parallel rocking levers 48 481, so that they always remain parallel to each other when moved by the rocking lever 481, which receives its motion from the cam $b$ through a lever 54, one end of which is connected by a link 541 to a small lever or crank 55 on the end of the spindle 482, upon which the lever 481 is mounted. The bars are shown in their extreme outward position in Fig. 6, the gripping-levers 42 having released the wires $w$, which can pass freely between the gripping-faces 43 and 44. The bars are indicated in their extreme inward position by dotted lines in Fig. 6 and in full lines in Fig. 1, in which position the springs 45 act upon the levers 42 and cause them to grip the wires between the faces 43 44.

When it is desired to apply a tension to the wires, the tension-boxes 40, with their gripping-levers 42 open, are advanced against springs 49 by a sliding piece 50, which is moved along the guide-rods 41 by the cam $b$ through a lever 51 and link 52. The wires are then gripped by the gripping-levers 42 and the sliding piece 50 moved back to its normal position, whereupon the springs 49 exert a pressure against the tension-boxes 40, and thereby apply sufficient tension to the wires to take up any slackness therein. When the tension upon the wires is no longer required, the gripping-levers 42 release them, and the springs 49 thereupon force the tension-boxes back against the sliding piece 50. The levers 54 and 51 are kept in contact with the cam $b$ by springs 53 and 56. The cam $b$ is so designed, as shown in Fig. 24, as to actuate the levers 51 54 in their proper order as required. The respective parts of the cam $b$ corresponding to the periods at which tension is applied to or removed from the wires are indicated in Fig. 24 as follows: At 602 the tension is off the wires to allow the bottle to rise and carry the top wires with it, at 603 tension is applied to draw the wires tightly about the bottle-neck while twisting, at 604 tension is again removed from the wires to allow them to be drawn across the wiring-space of the machine, and at 605 tension is again applied to strain the top wires to allow the capsule-lifter to pass freely through them. The wires after passing through the tension-gear above described are led through the twisting-gear. (Shown in sectional elevation in Fig. 9 and in position in Figs. 1 and 3.)

The wires are passed through holes 33 in a spindle 31, and thence through an end piece or face-plate 30, which is supported by pins 301, capable of sliding against springs 32 in recesses in the spindle 31. The object of the movable end piece or face-plate 30 is to allow the twisting to be commenced closer to the bottle-neck than is possible when the end of the twisting-spindle is solid, as in the machine described in the specification to the Letters Patent No. 632,174 before referred to. The twisting-spindle is rotated at the correct time by spur-gearing 311 312 from the driving-shaft $y$, controlled by a clutch 313, operated from a cam $c$, and the spindle is also returned or rotated in the reverse direction by a spiral spring 314 similarly to the twisting-spindle described in the specification above mentioned. The springs 32 remove undue strain from the back twist 29, so that when the spindle 31 is rotated by the spring 314 there are no sharp bends in the wires, thus allowing them to pass more easily through the holes 33 when drawn out by the looping-hooks, as afterward described.

The looping-hooks 89, whose function is to advance across to the twisting-spindle, secure the wire, draw the same back, and then to form a loop in the wire when it is twisted by the twisting-spindle, are of the same construction as those described in the specification before referred to; but in the present invention instead of the looping-hooks being revolved twice before stopping the segment which revolves the hooks is divided into two parts 60 and 61. The part 60 revolves the hooks at the same time that the twisting-spindle revolves, but the part 61 does not engage the pinion 62 upon the looping-spindle 621 until the wire is twisted and cut off at the twisting-spindle, when the second revolution of the looping-hooks takes up all slackness in the wire and draws it tightly around the bottle-neck. The looping-hooks are advanced across to the twisting-spindle to secure the wire by the part 628 of the cam $j$, Fig. 24, and are drawn back by the part 629.

Just after the looping-hooks have drawn the wire across the wiring-space of the machine the lower wires are drawn aside to allow the neck of a rising bottle to pass between them, after which the said wires are released and spring tightly against the bottle-neck. The mechanism for performing this function is illustrated in Figs. 2, 13, 14, and 15, and it is simpler and more definite in action than the mechanism employed for the same purpose described in the specification before referred to.

Two hooks 170 and 190 are pivoted on pins 171 and 191 to two bars 172 and 192, respectively. The bar 172 slides in a guide 181, and the bar 192 is fixed to the end of a lever 202, and each bar is provided with a forked extremity 219. The hook 170 is also attached by a pin 174 to a rod 173, which is provided with catches 175 176 and two V-grooves 177 178, and the hook 190 is similarly attached to a rod 193 by a pin 194, the rod 193 being provided with catches 195 and 196 and with V-grooves 197 and 198. Two pointed pins 179 and 199, sliding under the action of springs 160 and 200 in recesses within the bar 172 and lever 202, respectively, are adapted to engage either of the respective grooves 177 197 and 178 198. The lever 202 is formed integral with another lever 204 and both are secured to a rock-shaft 206. The lever 204 is connected by a rod 208 to a rocking lever 212. This lever is pivoted at 210 to a bracket 214, attached to the machine-frame, and carries at the extremity of one arm a roller 211, which is kept in contact with a cam $e$ by a spring 213 acting upon the other arm of the said lever. The extremity 189 of this arm is connected by a link 188 to a lever 182. One end, 183, of the lever 182 is loosely jointed to the bar 172, while its other end, 186, is connected by a link 185 to a bracket 187, secured to the machine-frame.

The operation of the above-described mechanism is as follows: The mechanism being in the position shown in Fig. 13, when the bottle is wired the cam $e$ revolves in the direction indicated by the arrow until the part 215 (see Fig. 24 also) reaches the roller 211, when the lever 212 moves on its pivot 210 and the bars 172 and 192 are both thrust toward the wires, each engaging a wire held within its fork end 219. The rods 173 and 193 are also carried inward by their respective bars 172 192 until the projections or catches 195 175 engage with the stops 201 and 275, whereupon the bars 172 192, still continuing to move the hooks 170 190, are pivoted about their pins 171 191, and each engage or inclose a bottom wire within their respective forks 219, as shown in Fig. 14. When the rods 173 193 are in this position, the pins 179 199 engage with their respective grooves 177 197, and the bottom wires are thereby locked within the hooks 170 190, which are next caused to recede and draw the wires aside by the cam $e$ continuing to revolve and bringing its inclined part 216, Figs. 13 and 24, in contact with the roller 211. The part 216 of the cam is not so long as the part 215, and therefore the bars 172 192 are not drawn completely back, but only so far as to cause the catches 176 196 to come up to the stops 276 201, (see Fig. 15,) the hooks still retaining their hold upon the wires until the part 218 of the cam $e$ comes in contact with the roller 211, when the bars 172 192 are drawn still farther back, and the catches 176 and 196 come in contact with the stops 276 201, and the hooks are moved about their pivots 171 191 and release the wires and allow them to spring about the neck of the bottle, which has passed up between them while they were drawn aside. This last movement of the bars 172 192 causes the pins 179 199 to leave the slots 177 197 and engage with the slots 178 and 198, respectively, thus securing the hooks 170 190 open, ready to advance again as required.

The mechanism for cutting the wire after it has been twisted is illustrated in detail in Figs. 22 and 23.

A cam-slot 360 is formed in the face of the spur-wheel 311, which operates the twisting-gear hereinbefore referred to. A roller 363, carried by one end of a bell-crank lever 350, works in the cam-slot. The lever 350 pivots on a spindle 353 and is connected by a bar 351 to another bell-crank lever 35, which also pivots freely on the spindle 353, but is also free to slide thereon against a spring 36. One arm of the lever 35 is forked, as shown in Fig. 23, and carries between the fork a lever 352, which when engaged by a cam-roller 361 actuates a cutting-bar 355, sliding in bearings on the under side of the lever 35, hereinafter referred to as the "cutting-arm."

The object of the cam-slot 360 is to operate the cutting-arm 35 in such a manner that it is brought down at the proper moment on top of the wires, which are afterward cut by the cutter 355 when operated by the cam-roller 361, engaging the lever 352. The cutting-arm 35 is held up against the bending-down lever 78 (hereinafter referred to) by the spring 36, so that whatever the size of the bottle-neck the wire is always cut at a regulated distance from the same. The cutting-arm is also provided with a wedge-shaped extremity 38, which engages with the plate 30 of the twisting-spindle, so as to insure that a certain length of wire required to form part of the next loop will be left projecting from the twisting-spindle after the wires are cut.

A stop 362 is provided upon the back of the wheel 311, which engages with a fixed stop 362', Fig. 23, on the machine-framework when the wheel is returned to its normal position by the spring, as before described with reference to Fig. 9.

After the wire has been twisted and cut off the projecting ends are bent down close to the bottle-neck. The mechanism for performing this function is illustrated in detail in Figs. 9 to 12.

Two levers 77 78, hereinafter referred to as the "bending-down" levers, are pivoted on pins 79 to a bush 80, sliding on the cylindrical guide or tube 81, in which works the capsule-lifter 150 hereinbefore referred to. The levers are connected by a joint 86 to insure an equal movement from or toward the center line of the tube 81. The bush 80 is caused to slide up and down as required by a cam $g$, which acts upon a lever 82 on one end of a rock-shaft 83, upon the other end of which is a lever 84, connected by a link 85 to the bush. The friction-roller on the end of the lever 82 is kept in close contact with the cam $g$ by a spring 831. The arm 77 is formed with a projection or cam-surface 76, in contact with which is a roller 74, carried on the end of one arm of a lever 73, pivoting on a pin 701. The end 75 of the other and longer arm of the lever 73 is jointed to a rod 72 in such a manner that the rod is free to rotate. The rod 72 carries at one end a cam-plate 681, formed with two projections 67 68, which are respectively caused to come in contact, as afterward described, with two stops 66 and 69, the former of which is formed on the link 65, connecting the lever 87 and looping-spindle 621, and the latter on a bracket 70, fixed to the machine-frame. Just previous to the twisting operation it is desirable that the looping-spindle shall be free to move independent of its actuating-cam $j$, so that its distance from the bottle-neck may be regulated automatically whatever the size of the bottle. It is therefore set free at the required time and advances under the pull of the wires as the twisting commences. This movement of the spindle is regulated by the stop 66 and projection 67 on the cam-plate 681, the movement of which is in turn regulated by the movement of the lever 77 through the mechanism above described. The levers 77 and 73 of this mechanism are so proportioned that any movement of the point of the lever 77 from or toward the center line of the bottle is accompanied by an equal movement of the rod 72.

In order that the looping-spindle may be left free to slide, as before described, the cam $j$ is cut away at one portion of its circumference, as indicated at 625, Fig. 24, whereby the ends of the levers 87 and 88, Fig. 3, are quite free. To again engage the levers and open the looping-hooks at whatever position they may then occupy, a wedge-shaped piece 90, Figs. 3 and 24, is provided, sliding in a guide 91 on the cam in a direction parallel to the axis of the shaft $z$. A roller 92 is attached to the wedge-shaped piece, which engages for a portion of each revolution with a cam-plate 93, attached to the frame of the machine. At the end of the twisting operation the wedge-piece 90 comes in between the rollers on the ends of the levers 87 88, and as it is free on the cam $j$ it adjusts itself and forces them apart, and thus opens the looping-hooks 89, Fig. 9, without altering their position. The roller 92 then engages the cam-plate 93, the wedge-shaped piece 90 being thereby moved, and the looping-hooks are drawn back open, while the rollers of the levers 87 88 are traveling on the straight portion of the wedge-shaped piece 90, which is brought into line with the fixed portion 627, Fig. 24, of the cam $i$.

The objects of the bending-down levers and mechanism connected therewith, just described, are, first, to provide means for gaging the size of the bottle-head and accordingly regulating the distance of the looping-hooks therefrom previous to the twisting operation, and, second, to provide means for bending down the projecting ends of wire after the cutting operation.

The operation of this mechanism is as follows: The wires having been drawn across the wiring-space by the looping-hooks and the lower wires drawn aside by the side hooks, as previously described, the bending-down levers 77 78 descend onto the top wires, this movement corresponding to the part 621 of the cam $g$, Fig. 24. A bottle is then raised by the lifting-gear, and its head passes between the lower wires, reaches the top wires, and is then forced up between the bending-down levers, which open out to the required amount as the head of the bottle is forced up between them. The bottle having reached the wiring position, the side hooks release the lower wires, which spring about the bottle-neck. The bending-down levers are held close up against the bottle-head by the cutting-arm 35, before referred to, and they therefore caliper or gage the size of the head. The distance the point of the lever 77 is moved in a direction away from the center line of the bottle, depending upon the size of the bottle-head, determines the movement of the rod 72 and therefore the position of the projection 67 and the stop 66, engaging therewith, which determines the movement and position of the looping-spindle previous to the twisting operation. It will therefore be understood that the distance of the looping-hooks from the bottle-neck previous to the twisting operation will always be the same whatever the size of the bottle-head. The cutting-off lever and end 30 of the twisting-spindle are similarly gaged by the bending-down levers 78. After the wire has been twisted and cut off the bending-down levers 77 78 are forced down by the cam $g$ onto the projecting ends of the wire, so as to press them close against the bottle-neck, this movement corresponding to the part 619, Fig. 24. They are then raised up to the positions shown in Fig. 12, this movement corresponding to the part 620, Fig. 24, the cam-surface 76 on the lever 77 leaving the roller 74, so that the lever 73 is free to move forward a short distance. When the looping-hooks next move across to catch a fresh supply of wire from the end of the twisting-spindle, the rod 72 moves with them until the projection 68 on the cam-plate attached to it engages with the stop-pin 69, when the inclined form of the projection causes the cam-plate to tilt, as shown in Fig. 11, and allow the pin 66 to pass the projection 67. When the looping-hooks are returned with the wire and the stop-pin 66 passes the projection 67, the cam-plate is returned to its normal position by a spring 71. (Shown more clearly in Figs. 10 and 11, which are sections on the line $s\ s$, Fig. 9.)

The different parts of the machine having been described in detail, the general operation of the complete machine may be described as follows: It is assumed that the machine is at rest and that a bottle has just been wired and delivered. The machine will then be ready to receive another bottle and several of the mechanisms will already have performed a part of their functions—namely, the looping-hooks will have secured the wire projecting from the end of the twisting-spindle and drawn it across the gap of the machine, the side hooks (hereinbefore described with reference to Fig. 13) will have drawn aside the two lower wires, and the capsule-lifter 150 will have secured a capsule from the container 160, as hereinbefore described with reference to Figs. 3 and 9. Another bottle is then placed with its neck within the jaws 130 131, and the push-rod 25 is thrust inward, so as to withdraw the latch 22 from the end of the lever 13, which lever is immediately acted upon by the spring 15 and releases the key 11, and the pulley 10 is thereby keyed to the driving-shaft $y$ and the machine started, as hereinbefore described in detail with reference to Figs. 4 and 5. As soon as the machine is started motion is transmitted from the driving-shaft $y$ to the cam-shaft $z$ by the spur-gearing 7 8, and the different mechanisms are set in motion and perform their different functions in their proper order, as hereinafter described. The first to be affected is the capsuling-gear. The cam $f$, through the levers 151, forces the capsule-lifter 150, with a capsule on its extremity, down onto the cork of the bottle, which latter is suspended by its collar within the gripping-levers 130 131. The cork is thereby thoroughly pressed down and prevented from "shooting" or being forced out before it is wired. The cam $k$ next raises the lifting-bracket 105 through the levers 115 and toggle-links 117. The bracket continues to rise until the table or support 100 touches the bottom of the bottle, when the further movement of the support is prevented owing to the weight of the bottle combined with the pressure of the buffer-springs 158 of the capsule-lifter 150. The lifting-bracket 105, however, continues to rise, the adjustment between the support 100 and bracket 105 allowing it to do so, as hereinbefore fully described with reference to Fig. 1, wherein a rack-and-pinion adjustment is shown, or with reference to Figs. 18 to 21, which illustrates a hydraulic adjustment. When either the rack 101 is locked by the pawl and ratchet-wheel 107 104 or the piston-rod 120 is prevented from descending by the valve 124 being closed, as hereinbefore described, the table 100 and the bracket rise together, the cam $f$ allowing the capsule-lifter 150 to rise at the same rate as the lifting-bracket, but still maintaining a compression of the springs 158. The gripping-levers 130 131 are opened just at this period to allow the bottle to pass upward by the cam-plate 141, carried by the lifting-bracket 105, engaging with the pin 140 on the lever 131, as hereinbefore described with reference to Fig. 8$^a$. The two top wires are carried over the cork as it rises and are held closely against the cork and collar by the bending-down levers 77 78, as shown in Fig. 9, which shows the bottle in its highest position. When the bottle reaches this position, tension is applied to the wires, as hereinbefore described with reference to Figs. 6 and 7, to draw up any slackness in the wires. At this instant the side hooks 170 190 are caused to release the lower wires, as hereinbefore described with reference to Figs. 13, 14, and 15, the said wires being drawn by the tension-gear close against the bottle-neck just below the collar. At this instant also the levers working the looping spindle and hooks are temporarily disengaged from their operating-cam $j$, so that the looping-hooks are free to move forward under the pull of the tension-gear until the pin 66, Fig. 9, engages with the stop 67 on the cam-plate 681, whose position is regulated by the bending-down lever 77 through the roller 74 and lever 73, the arms 77 78 being pressed against the bottle-neck one on each side, so that the position of the looping-hooks is regulated according to the size of the bottle-neck, as hereinbefore fully described. The part indicated in Fig. 24 by 607 of the cam $c$ next throws the clutch 313 into gear with the wheel 311, which through the pinion 312 revolves the twisting-spindle 31. At the same time the segment 60 engages the pinion 62 and revolves the looping-spindle through one revolution. The wheel 311 continues to rotate and the cam-slot 360 therein brings down the cutting-arm 35, which is held tightly against the bending-down arm 78 by the spring 36, the wedge-piece 38 at the same time forcing back the face-plate 30 of the twisting-spindle (if it has not been drawn back sufficiently under the action of the twisted wire) to insure that a sufficient portion of the twisted wire shall be left on the spindle when the wire is cut off by the cutter 355, as hereinbefore described with reference to Figs. 22 and 23. After the wire is cut the cam $c$ disengages the clutch 313, whereupon the spiral spring 314 rotates the twisting-spindle 621 backwardly, as hereinbefore described with reference to Fig. 9 and as also described in the specification before referred to. Immediately the wire is cut the segment 61 engages the pinion 62, which occupies the position shown in Figs. 1, 2, and 3, and imparts another twist to the wire inside the loop and takes up any slackness that may still remain in the wire tying. The levers 87 and 88 are next engaged by the wedge-shaped piece 90 on the cam $j$, which opens the hooks 89 and releases the wire. The roller 92 then engages the cam-plate 93 on the machine-frame and the hooks 89 are drawn back, the levers 87 and 88 being at the same time brought into action again with the cam $j$, as hereinbefore described with reference to Fig. 3. The bending-down levers 77 78 are then brought down by the cam $g$, so as to bend the loop and projecting ends of wire close down against the bottle-neck. They are next drawn up again to their full height, which brings the cam-surface 76 on the lever 77 out of contact with the roller 74 of the lever 73 and leaves the roller to move forward when required, as afterward described. The lifting-bracket now starts to descend and is followed for a short distance by the presser 150, which, however, soon moves upward to its highest position. As the lifting-bracket continues to descend the gripping-levers 130 131 are released from the cam-plate 141 and close on the neck of the bottle and grip it just beneath the collar, when the bracket 132 is revolved upon its pivot 135 and carries the bottle over the chute 147, when the face 142 of the lever 130 engages the roller 145 on the bracket 146, which opens the levers and allows the bottle to drop. The bracket 132 is then moved back again into its normal position and its jaws close ready to receive another bottle, all as hereinbefore described with especial reference to Figs. 8 and 8$^a$. The lifting-bracket 105 continues to descend and the end of the rack 101 engages with the stop 113, which prevents it descending farther; but the wheel 104 being free to revolve the bracket is also free to descend into its extreme lower position. In the case where the hydraulic adjustment is used the downward travel of the table or support 100 is limited by the stops 220, as hereinbefore described with reference to Figs. 20 and 21. While the lifting-bracket is descending the looping-hooks 89 are moved by the cam $j$ toward the face-plate 30 on the twisting-spindle. The cam-plate 68 is also moved forward, it now being free to do so, as before explained. The hooks 89 travel forward and secure the wire and draw back with it across the part of the machine where the bottle is wired. The side hooks 170 190 are next moved in under the action of the cam $b$ to secure and draw aside the lower wires, as hereinbefore described with reference to Figs. 13, 14, and 15. Simultaneously with this the capsule-carrying tray 160, in which a capsule is placed, is moved in and the capsule-lifter 150 is forced down by the part 164 on the cam $e$, so as to secure a capsule upon its pins 159, whereupon it is immediately drawn up again a short distance to allow the tray to move out. The cam $a$ then engages the lever 18 and forces the wedge-shaped end 12 of the lever 13 against the bush 27, where it is held by the latch 22, and as the pulley 10 revolves the wedge engages the key and withdraws it from the slot 9, and thereby stops the machine, as hereinbefore described with reference to Figs. 4 and 5. The machine will then remain at rest until another bottle is placed within the gripping-levers 130 131 and the push-rod 25 thrust inward, when the whole operation above described will be repeated.

Having thus described our invention, what we claim as new, and desire to secure by Letters Patent, is—

1. In a bottle-wiring machine, wherein the driving-pulley is connected to the driving-shaft, by a spring-actuated sliding key engaging with a recess in the boss of the pulley, means for automatically withdrawing the said key when a bottle has been tied consisting of a wedge on a lever actuated by a cam through suitable connections, said cam forcing the wedge against a spring into engagement with the key, in combination with a latch temporarily retaining the said wedge-shaped lever in engagement with the key, said latch being adapted to be withdrawn by a push-rod so as to release the lever and start the machine substantially as described.

2. In a bottle-wiring machine, means for lifting the bottle consisting of a support automatically adjustable to bottles of considerably-varying length comprising a pan or table, carried upon the end of a rack-bar sliding vertically in guides in the lifting-bracket, the said pan being brought against the bottom of a bottle suspended above it during the first part of the stroke of the lifting-bracket by friction, allowing it to adjust itself to the length of the bottle and afterward being definitely raised with the lifting-bracket by means of a pawl engaging the rack, either directly or through suitable gearing, when actuated by a cam-plate substantially as described.

3. In a bottle-wiring machine means for allowing a self-adjustment between the bottle-support and bottle-lifting bracket consisting of a rack-bar gearing with a pinion which is prevented from rotating by friction during the greater part of the upward stroke of the lifting-bracket but is locked by a pawl engaging with a ratchet-wheel toward the end of the stroke substantially as hereinbefore described.

4. In a bottle-wiring machine the combination with the bottle-lifting bracket of a bottle holder or support carried upon the upper end of a piston-rod or plunger traveling in a cylinder containing oil or other liquid and connected to a reservoir or jacket said cylinder communicating with the reservoir by passages controlled by a valve operated as required by a lever engaging with a cam-plate attached to the machine-frame, substantially as hereinbefore described.

5. In a bottle-wiring machine means for allowing an automatic adjustment between the bottle-support and the bottle-lifting bracket consisting of a piston-rod and piston or plunger working in a cylinder containing oil or other liquid and connected to a reservoir or jacket with which the said cylinder communicates by passages controlled by a valve in such a manner that the piston-rod carrying the bottle-holder is prevented from descending on the fore part of the upward stroke of the lifting-bracket by friction but is positively prevented from descending toward the end of the stroke, substantially as hereinbefore described.

6. In a bottle-wiring machine means for delivering the bottle after wiring, comprising a bracket pivoted to the machine-frame and carrying gripping-levers which are adapted to open and allow the neck of the bottle to pass up between them when it is lifted to the wiring position but which grip the bottle below the collar after it is wired and means for opening the levers and thereby releasing the bottle when the bracket is oscillated to the delivering position substantially as hereinbefore described and illustrated.

7. In a bottle-wiring machine means for temporarily holding the bottle consisting of a pair of levers geared together to insure simultaneous movement and forced together by a spring the outer ends of said levers being rounded or curved to facilitate the insertion of a bottle and the inner or gripping faces being formed at such angles that they grip the bottles centrally and so as to allow for variation in the size and shape of the bottle-neck substantially as hereinbefore described and illustrated.

8. In a bottle-wiring machine having gripping-levers for temporarily holding the bottle, means for opening said levers to allow the bottle to pass between them when being raised to the wiring position consisting of a cam-plate carried by the bottle-lifting bracket and adapted to engage with a roller or projection on one of the levers substantially as hereinbefore described and illustrated.

9. In a bottle-wiring machine the combination of a plunger provided with a spike or spikes in its face and slots in its extremity and a capsule-holder consisting of a pan carried by a bracket oscillated as required so as to bring a capsule directly under the plunger, which is caused to descend and secure a capsule upon its spike by a cam acting through a pair of levers the ends of which are connected to a cross-head transmitting motion to the plunger by a spring substantially as described.

10. In a bottle-wiring machine having a capsule-lifter and cork-compressor in the form of a plunger, an elastic connection and buffer-check between the said plunger and its operating means substantially as described and illustrated.

11. In bottle-wiring machines in combination a plunger mechanically actuated, self-centering gripping-levers for temporarily supporting the bottle by the collar while such plunger compresses the cork and means for allowing the plunger to adapt itself to varying lengths of bottle-necks and corks consisting of a spring interposed between the plunger and its actuating means, substantially as described.

12. In bottle-wiring machines the combination of a plunger mechanically actuated and self-centering gripping-levers for temporarily supporting the bottle by the collar while said plunger compresses the cork, a buffer-spring interposed between the plunger and its actuating means, for allowing of a variation in the lengths of the bottle-necks and corks for maintaining a pressure on the cork as the bottle is raised to the wiring position, and means for opening the gripping-levers to allow the bottle to rise to the wiring position consisting of a cam-plate carried by the lifting-bracket and adapted to engage with a roller or projection on one lever, the said levers being geared together and forced together by a spring, so that they close and grip the bottle as it descends substantially as hereinbefore described.

13. In a bottle-wiring machine in combination: means for lifting the bottle capable of automatic adjustment to varying lengths of bottles comprising a pan or table carried upon the end of a rack-bar sliding vertically in guides in the lifting-bracket and adapted to be supported thereby either through friction or through a pawl engaging the rack, either directly or through suitable gearing when actuated by a cam-plate, self-centering gripping-levers for temporarily supporting the bottle during the adjustment of the lifting-gear and means for compressing the cork when the bottle is held by the gripping-levers and for maintaining a pressure thereon as the bottle is raised to the wiring position, comprising a plunger actuated by a cam through levers linked to a sliding cross-head between which and said plunger a buffer-spring is interposed substantially as hereinbefore described.

14. In a bottle-wiring machine in combination: means for lifting the bottle capable of automatic adjustment to varying lengths of bottles comprising a pan or table carried upon the end of a piston-rod sliding in a cylinder carried by the lifting-bracket such cylinder containing oil or other liquid and communicating with a reservoir or jacket such communication being controlled by a valve operated by a cam-plate in such a manner that the piston-rod is only prevented from sliding down relatively to the lifting-bracket by friction when the valve is open but positively prevented when the valve is shut, self-centering gripping-levers for temporarily supporting the bottle during the adjustment of the lifting-gear, and means for compressing the cork when the bottle is held by the gripping-levers and for maintaining a pressure thereon as the bottle is raised to the wiring position comprising a plunger actuated by a cam through levers linked to a cross-head between which and said plunger a buffer-spring is interposed substantially as hereinbefore described.

15. In a bottle-wiring machine means for applying a tension to the wires consisting of a number of boxes corresponding to the number of wires employed and adapted to be moved on guide-rods against the action of springs said boxes being provided with gripping-levers which are forced by springs against the wires so as to grip them against faces formed on the boxes when a tension is to be applied, but which are released from the wires when no tension is required by parallel rods worked by rocking levers substantially as hereinbefore described and illustrated.

16. In a bottle-wiring machine means for applying a tension to the wires consisting of a number of boxes corresponding to the number of wires employed and provided with gripping-levers, which are adapted to grip the wires under the action of springs but which are adapted to release the wires when said springs are compressed by the movement of two parallel slides in combination with a sliding piece which forces the boxes forward against the action of a spring said sliding piece moving rearwardly, when the boxes and levers have gripped the wires, to allow the springs returning to tighten the wires and moving forward when the parallel slides force the levers to release the wires to obtain a new grip of the wires substantially as described.

17. In a bottle-wiring machine the combination with a twisting-spindle periodically rotated of a movable end piece or face-plate substantially as described.

18. In a bottle-wiring machine the combination of a twisting-spindle provided with a movable end piece or face-plate with a cutting-bar formed with a wedge-shaped extremity substantially as hereinbefore described and illustrated.

19. In a bottle-wiring machine wherein the looping-spindle is temporarily freed from its operating-cam so as to allow of self-adjustment, means for opening the looping-hooks while the spindle is free and then moving the spindle rearwardly with the hooks still open and guiding the operating-levers onto the cam, consisting of a wedge-shaped piece arranged so as to slide in guides on the cam at a part of the periphery where it is cut away in order to free the looping-spindle as aforesaid, said wedge-shaped piece being adapted to engage the operating-levers whatever their position, thereby opening the looping-hooks, and being provided with a contact-roller adapted to engage with a cam-plate on the machine-frame which causes the levers to move the spindle rearwardly with the hooks open and also guide the levers onto the cam substantially as described.

20. In a bottle-wiring machine a cam for operating the looping-spindle cut away at a portion of its periphery and provided at that part with a wedge-shaped piece free to slide laterally independent of the cam and adapted to be engaged by a fixed cam-plate substantially as and for the purposes described.

21. In a bottle-wiring machine wherein three or more wires are employed and the bottle-neck passes between two of them, means for drawing these latter wires apart consisting of side hooks pivoted on the forked extremities of bars in such a manner that they are capable of engaging the wires within the forked extremities and afterward releasing them substantially as described and illustrated.

22. In a bottle-wiring machine wherein three or more wires are employed and the bottle-neck passes between two of them means for drawing these latter wires apart consisting of hooks pivoted on the forked extremities of reciprocating bars said hooks being also attached to rods sliding on the bars and engaged by spring-operated catches whereby the hooks are temporarily locked in their open and closed positions substantially as described and as illustrated.

23. In a bottle-wiring machine wherein three or more wires are employed and the bottle-neck passes between two of them means for drawing these latter wires apart and afterward releasing them comprising in combination bars provided with forked extremities for engaging the wires and reciprocated by rocking levers worked from a cam and hooks pivoted upon the extremities of said bars and also attached to rods sliding on the bars and adapted to be engaged by spring-operated catches from which they are released by contact with fixed stops so as to open or close the hooks substantially as described and illustrated.

24. In a bottle-wiring machine, means for severing the twisted wire comprising a knife, a swinging arm carrying the same and loosely mounted upon its spindle so that it may move thereon, a spring acting against said arm and capable of yielding to accommodate said arm to different-sized bottles and a cam for operating said lever, substantially as described.

25. In a bottle-wiring machine means for cutting the twisted wires comprising in combination, a knife reciprocated by a cam-operated lever and carried by a swinging arm which is provided with a wedge-shaped extremity adapted to engage with the face-plate of the twisting-spindle, means for pressing said swinging arm close to the bending-down lever so that the wire is always cut the same distance from the bottle-neck whether such neck be large or small, consisting of a spring coiled about the spindle upon which the arm is loosely pivoted and means for bringing the swinging arm down to the wires as required consisting of a bell-crank lever one arm of which is attached to the swinging arm and the other carries a roller in gear with a cam substantially as hereinbefore described and illustrated.

26. In a bottle-wiring machine means for bending down the twisted ends of wire consisting of a pair of levers pivoted on a bush sliding on a vertical guide, said levers being geared together to insure simultaneous movement and being caused to descend and press the twisted ends of wire against the bottle-neck substantially as described.

27. In a bottle-wiring machine means for bending down the twisted ends of wire comprising in combination a pair of bending-down levers geared together to insure equal and simultaneous movement, a bush to which said levers are pivoted and which slides on a vertical guide, and a rocking lever connected to the bush by a link and oscillated by a cam so as to lower and raise the bending-down levers substantially as described and illustrated.

28. In a bottle-wiring machine means for adjusting the distance of the looping-hooks from the bottle-neck previous to the twisting operation comprising a cam-plate adapted to engage with a pin or projection either on or in connection with the looping-spindle, and a rod carrying said cam-plate and adjusted longitudinally by one arm of a bell-crank lever the other arm of which is in contact with one of the bending-down levers substantially as described and illustrated in the drawings.

29. In a bottle-wiring machine means for gaging the size of the bottle-head comprising a pair of gaging-levers geared together and pivoted on a bush sliding on a vertical guide, in combination with means for correspondingly adjusting the position of the looping-hooks comprising a bell-crank lever one arm of which is in contact with one of the before-mentioned levers and the other arm of which is jointed to a rod carrying a cam-plate which limits the longitudinal movement of the looping-spindle, the relative lengths of the arms of the bell-crank lever being so arranged that the movement of the cam-plate is always equal to the movement of the points of the gaging-levers substantially as described.

30. In a bottle-wiring machine in combination, the cutting-off gear, twisting-spindle and looping-spindle, with the bending-down levers and means for automatically adjusting said parts according to the size of bottle-neck by such bending-down levers substantially as described.

In witness whereof we have hereunto set our hands in presence of two witnesses.

ROBERT MARTIN CHAMBERS.
    CHARLES EDWARD CHAMBERS.

Witnesses:
 WM. MCGOWAN,
 ROBERT MCCUNE.